United States Patent [19]

Bauer

[11] Patent Number: 4,679,957
[45] Date of Patent: Jul. 14, 1987

[54] BALL JOINT SAFETY SYSTEM

[76] Inventor: John K. Bauer, 510 Lenox Ave., Miami Beach, Fla. 33139

[21] Appl. No.: 872,525

[22] Filed: Jun. 10, 1986

[51] Int. Cl.$^4$ .............................................. B25G 3/00
[52] U.S. Cl. .................................... 403/27; 403/115; 403/131
[58] Field of Search .............. 403/27, 131, 140, 135, 403/128, 124, 125, 122, 143, 127, 114, 115, 11, 2

[56] References Cited

U.S. PATENT DOCUMENTS

| | | | |
|---|---|---|---|
| 1,954,938 | 4/1934 | Lozonne | 117/311 |
| 2,510,406 | 6/1950 | Lucas | 403/143 |
| 2,624,123 | 1/1953 | Wilkerson | 33/203.2 |
| 2,672,597 | 3/1954 | Ritch, Jr. | 340/52 |
| 3,135,540 | 6/1964 | Herbenar | 403/124 |
| 3,438,646 | 4/1969 | Hannapel | 280/87 |
| 3,561,800 | 2/1971 | Hassan | 403/115 |
| 3,597,728 | 8/1971 | Kurtz | 340/52 |
| 4,355,543 | 10/1982 | Ikemoto et al. | 403/140 |
| 4,576,499 | 3/1986 | Smith | 403/27 |
| 4,613,251 | 9/1986 | Bellamy et al. | 403/114 |

FOREIGN PATENT DOCUMENTS

| | | | |
|---|---|---|---|
| 852022 | 10/1952 | Fed. Rep. of Germany | 403/115 |
| 0815332 | 3/1981 | U.S.S.R. | 403/27 |

*Primary Examiner*—Cornelius J. Husar
*Assistant Examiner*—Peter M. Cuomo

[57] ABSTRACT

A ball joint assembly having a primary ball and a primary bearing surface. The primary ball is coaxially attached to a main shaft which pivots near the point of contact between the primary ball and the primary bearing surface. The main shaft controls a coaxially connected secondary ball spaced apart from the primary ball and closely spaced from a secondary bearing surface, similar in orientation to the primary surface, so that the secondary ball floats freely at some predetermined distance from the secondary bearing surface. The secondary ball contacts a normally closed microswitch. As the primary bearing surface wears the main shaft rises bringing the secondary ball toward the secondary bearing surface and away from the microswitch. Eventually the secondary ball will contact the secondary bearing surface and the microswitch will be activated, causing a warning light to illuminate, thereby signalling wearout of the ball joint without catastrophic failure.

18 Claims, 2 Drawing Figures

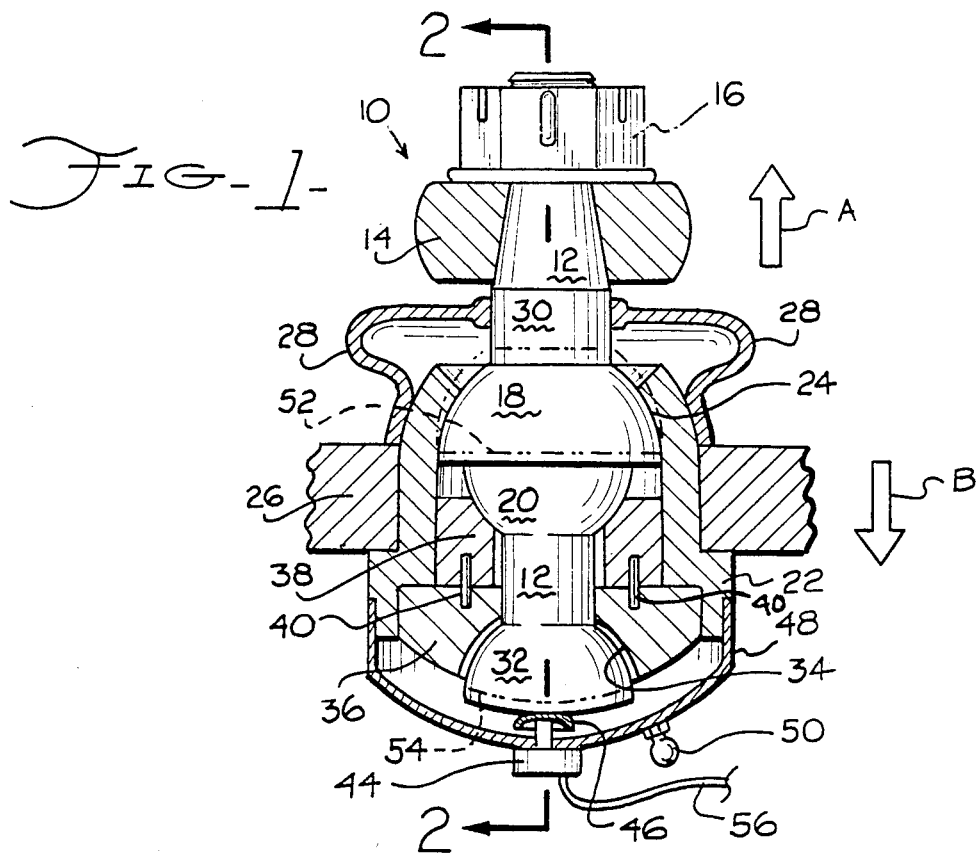
FIG-1-
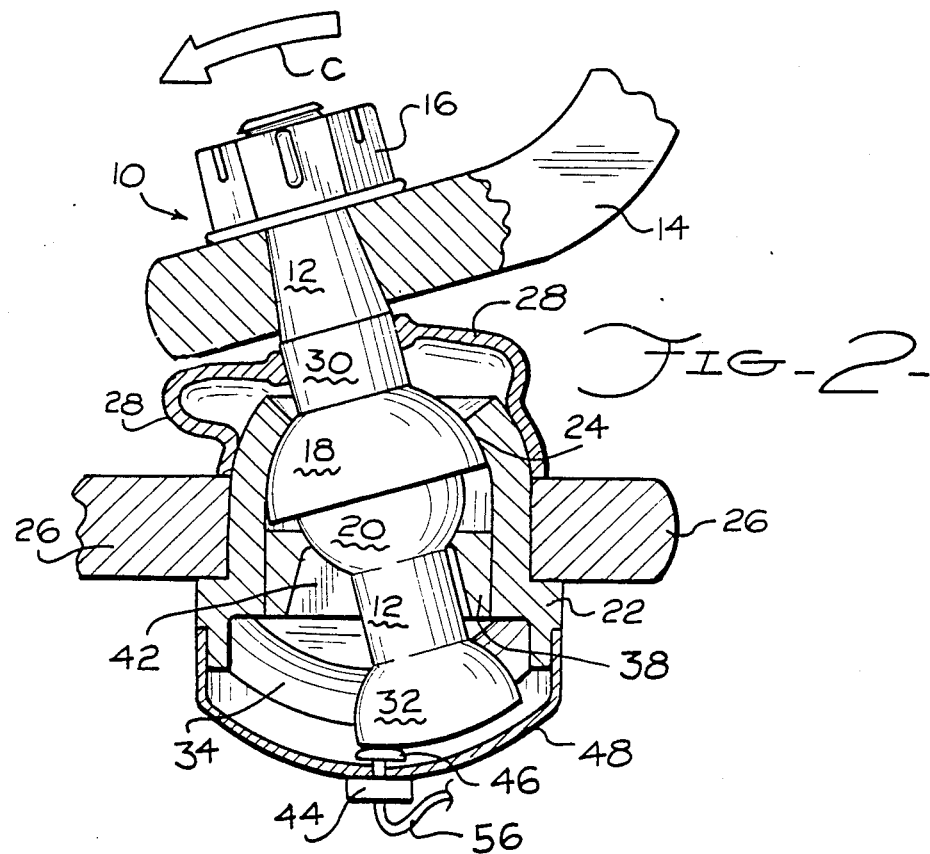
FIG-2-

BALL JOINT SAFETY SYSTEM

DESCRIPTION

1. Technical Field

The invention relates to an improved ball joint for use in vehicular suspensions and the like.

2. Background Art

The majority of modern automotive vehicles employ ball joint front suspension systems. Ball joints are utilized to connect a vehicle's suspension to the front wheels. Ball joints serve two purposes. First, a joint will rotate upon its own axis, thereby providing the rotational movement required for proper steering. Second, a ball joint will act as a pivot point whenever a wheel encounters a road irregularity.

While some vehicles contain suspension systems requiring only one ball joint for each wheel, the front wheels of most vehicles each contain two ball joints, as may be seen in U.S. Pat. No. 4,438,646 to Hannapel. A first joint connects the upper suspension arm of the vehicle to the wheel spindle. A second joint connects the lower suspension arms to the wheel spindle. The inner ends of the upper and the lower suspension arms are attached to the vehicle frame at pivot points. These two inner pivot points act in conjunction with the ball joints to provide the vertical movement necessary for the coil springs to compress or expand when the wheels encounter a bump or hole in the road.

There are four major suspension locations on a vehicle, one near each wheel. Conventional rear suspensions have only a minimal amount of failures. Problems with front suspensions, on the other hand, are not uncommon. The major cause of front suspension failures, other than collisions, is ball joint failures due to breakage or excessive wear. Such ball joint failures will result in substantial, and possibly total, loss of vehicle control.

Warning systems for vehicle malfunctions are known. For example, U.S. Pat. Nos. 3,597,728 to Kurtz; 3,438,646 to Hannapel; 3,672,597 to Ritch; 2,624,123 to Wilkerson; and 1,954,938 to Lozonne all teach warning systems which indicate a misalignment of wheels. Hannapel teaches such a system that is used on a vehicle having ball joints. However, none of these inventions involve an emergency backup arrangement. Nor do the inventions warn of broken or worn ball joints.

An object of the present invention is to provide a ball joint having a temporary emergency mechanical backup system and a warning circuit. It is a further object to provide such a ball joint which requires little or no modification to existing suspensions or to existing commercial or industrial machinery utilizing ball joints.

DISCLOSURE OF THE INVENTION

The above objects are achieved through the use of a secondary ball in combination with a primary ball in a compound ball joint. The secondary ball acts as a mechanical substitute after the primary ball joint has deteriorated some predetermined amount.

The primary ball functions as a typical ball and socket. The round portion of a primary ball has an axis shared with a movable main shaft. The inside surface of the assembly's housing is fixed and in frictional contact with the outer surface of the primary ball, thereby providing a primary bearing surface.

A secondary ball, which also has an axis shared with the assembly's main shaft, floats freely at some predetermined distance from a base plate saddle. The saddle has a surface shaped to be a secondary bearing surface and with a similar orientation. In applications such as vehicle suspensions the ball joint pivots in only one direction. For this reason the saddle surface is a groove having a width conforming to an arc of secondary ball motion, and a length conforming to an arc of primary ball motion.

Optimally, the diameter of the secondary ball is between 50 and 70 percent of the diameter of the primary ball. Each "ball" has an upper portion which may be spherical or may have a bell shape, or other curved, axially symmetric shape at its surface suitable for acting as a bearing. This upper portion is designed to handle the load. The lower portion of the primary ball typically has the same shape as the upper portion but is smaller in order to reduce the physical dimensions of the assembly, as is conventional in ball joint construction. The lower portion of the secondary ball has an oval shape that minimizes the height of the ball joint. The apex of the oval has an axis that is perpendicular to the center of the primary ball.

As the primary ball wears, the main shaft carrying primary and secondary balls rises, bringing the secondary ball up toward the secondary bearing surface. The secondary ball surface eventually makes contact with the surface of the saddle. When this contact takes place the secondary ball surface and the secondary bearing surface of the saddle work as the functional equivalent of the primary ball surface and primary bearing surface. That is, the secondary ball acts as an emergency mechanical backup system.

The lower, typically oval-shaped, portion of the secondary ball surface engages a normally closed microswitch. As the secondary ball rises due to ball joint wear, the secondary ball moves away from the body of the microswitch. The positioning of the microswitch is such that the switch will cause a warning light to illuminate after the ball joint has worn excessively.

The present invention may be used as a substitute for a conventional ball joint or may be installed in new vehicles.

BRIEF DESCRIPTION OF THE DRAWINGS

FIG. 1 is a front sectional view of a ball joint in accord with the present invention.

FIG. 2 is a side sectional view of the assembly of FIG. 1.

BEST MODE FOR CARRYING OUT THE INVENTION

With reference to FIGS. 1 and 2, a lower ball joint 10 of a vehicle's front suspension system is shown. The ball joint has a main axially symmetric shaft 12 onto which the spindle member 14 of a front wheel, not shown, is secured. The wheel spindle member 14 is held in place by nut 16.

A primary ball collar 18 is an axially symmetric member coaxial with the main shaft 12. The ball collar 18 is a truncated ball whose shape resembles a bell. It is the upper external surface of ball collar 18 which functions as the primary ball of the ball joint 10. The main shaft collar support 20 coaxial with main shaft 12, retains the upper ball collar in position. Main shaft 18 may be machined so that the ball collar is integral with the shaft or the ball collar may be a separate member to which the main shaft is coaxially connected.

The ball housing 22 contains an internal bearing surface 24 in mating frictional contact with the outer surface of upper ball collar 18. The ball housing 22 is secured to the vehicle's lower suspension arm 26 which supports the weight of the vehicle.

In a rest position the axis of main shaft 12 is in a perpendicular position relative to the ground, as shown in FIG. 1. However, when the tire of the vehicle encounters a bump the vehicle's tire and wheel spindle member 14 are forced in the direction of arrow A. The ball housing 22, on the other hand, is provided with a continuous downward force, indicated by arrow B, by the suspension arm 26.

As a result of the different forces acting on the wheel spindle member 14 and the suspension arm 26, the main shaft 12 of the ball joint tilts in the direction of arrow C of FIG. 2. But while the main shaft tilts, the ball housing does not. Thus, the ball joint provides one of the four pivot locations found in the suspension system associated with each front wheel.

The bearing surface 24 is subject to wear and to breakage. The same is true of the ball collar 18. The two surfaces are in frictional contact and will eventually wear down. The rubber boot 28 connected to shaft fitting 30 does lengthen the ball joint's use-life by reducing the number of dirt particles which may become lodged between the surfaces, but even when kept particle-free surface wear occurs.

As the ball joint wears, the main shaft 12 rises and surface contact between upper ball collar 18 and ball housing 22 decreases. If not replaced by a new ball joint the upper ball collar of a conventional ball joint will eventually separate from the ball housing. Such separation results in a substantial, and possibly a total, loss of vehicle control. The present invention, however, utilizes a secondary ball 32 as a mechanical backup to damaged ball joints.

The secondary ball 32 is uniformly spaced apart from the lower surface of a saddle 34 of a base plate 36. The secondary ball is an axially symmetric, bell-shaped member, coaxial with main shaft 12. The base plate 36 is secured to a dished slotted supprt 38 by locking pegs 40.

The secondary ball 32 floats freely as the ball joint 10 tilts in the direction of arrow C. The saddle 34 is formed by a groove in the base plate 36 which is spaced apart from the secondary ball of a properly operating ball joint with little wear. Optimally, the secondary ball has shape or dimension that is between 50 to 70 percent the size or corresponding dimension of the primary ball 18 and the distance between the secondary ball and the saddle 34 is about 0.062 inches. The spacing between the primary ball and the secondary ball is such that the closer the secondary ball is to the primary ball the larger the secondary ball may be.

The contour of the surface of the base plate saddle 34 conforms to the arc of upper ball, allowing the secondary ball to remain clear of the saddle. In a vehicle, a ball joint will only oscillate forward and backward, as viewed in FIG. 1. For this reason the saddle is shown to be an arced groove. It is understood, however, that the saddle may be adapted for use in applications which permit the ball joint to oscillate in a greater number of directions. The same is true of the dished slotted support 38 which has a cut-away portion 42 to permit the main shaft 12 to swing freely. There is a distance of between 0.15 and 0.25 that separates the base plate 36 and the main shaft 12 so that the base plate does not interfere with the motion of the main shaft.

The bottom of the secondary ball 32 is contoured to provide constant contact with a normally closed microswitch 44 throughout the arcuate movement of the secondary ball. A small plate 46 is fixed to the microswitch to insure contact in the extreme positions of the secondary ball. The plate 46 is curved downward to prevent galling. The microswitch is secured to the base 48 of the ball joint. The ball joint base 48 includes a grease fitting 50 to be used for lubrication purposes.

In operation, a properly functioning ball joint 10 will pivot whenever a wheel of a vehicle encounters a road irregularity and will rotate upon its own axis whenever the steering wheel is turned. The secondary ball 32 will have no effect on a properly functioning ball joint since the ball makes contact with nothing other than the microswitch 44.

As the surfaces of the primary ball 18 and the ball housing 22 wear the main shaft rises, bringing the secondary ball up also. At some point, indicated by the dashed lines 52, 54 of FIG. 1, the secondary ball 32 and the base plate saddle 34 contact in their similar arcs. When this contact takes place the secondary ball and the saddle become the functional equivalent of the primary ball and the bearing surface 24. That is, the secondary ball provides an emergency mechanical backup arrangement.

At the same time that the secondary ball contacts the saddle, the secondary ball activates the microswitch 44 which, through wire 56, illuminates a light on the vehicle's instrument panel to warn the operator of the ball joint's worn condition.

The ball joint of the present invention may be installed in new vehicles or may be used to replace worn out ball joints. Normally, no modification to existing suspension systems is needed to secure or position the safety ball joint in the place of a conventional ball joint.

The ball joint may also be applied to existing commercial and industrial machinery. As noted above, the size and shape of the secondary ball and the base plate saddle may be modified to permit the secondary ball to function as a back up in applications which require the ball joint to pivot in more directions than the mere back and forth movement of a vehicle's ball joint.

I claim:
1. A ball joint assembly comprising,
   main shaft having a longitudinal axis,
   a primary ball having an axially symmetric, rounded outer surface coaxially mounted to said main shaft,
   a primary bearing surface having a shape similar to the primary ball outer surface and being in frictional contact therewith, said primary bearing surface being relatively stationary with respect to said primary ball,
   a secondary ball having an axially symmetric, rounded outer surface coaxially formed on said main shaft and spaced apart from the primary ball, and
   a secondary bearing surface having a shape similar to the secondary ball outer surface and adjacent to, but spaced apart from, said secondary ball by a predetermined distance so as to define a substantially uniform gap about said secondary ball outer surface, said secondary bearing surface being relatively stationary with respect to said secondary ball, said main shaft, primary and secondary balls being movable with respect to said primary and secondary bearing surfaces, said gap permitting the secondary ball to move substantially free from contact with said secondary bearing surface with movement of said main shaft.

2. The assembly of claim 1 wherein said secondary bearing surface is an arcuate saddle having an inner radial surface and an inner longitudinal surface, said radial surface conforming to said rounded outer surface of said secondary ball.

3. The assembly of claim 2 wherein said longitudinal surface of said secondary bearing surface conforms to the rounded surface of said primary ball.

4. The assembly of claim 1 wherein said predetermined distance between said secondary ball and said secondary bearing surface is between 0.05 inches and 0.07 inches.

5. The assembly of claim 1 wherein said rounded surface of said secondary ball has a dimension between 50 percent and 70 percent of a corresponding dimension of said rounded surface of the primary ball.

6. The assembly of claim 1 having a means for signalling ball joint deterioration.

7. The assembly of claim 6 wherein said means for signalling ball joint deterioration includes a microswitch in contact with said secondary ball, said microswitch positioned to trip when said frictional contact of said primary bearing surface with said primary ball has deteriorated some predetermined amount.

8. A ball joint assembly comprising,
a main shaft having a longitudinal axis,
a primary ball having an axially symmetric rounded portion coaxial on said main shaft,
a stationary housing having a primary bearing surface in contact with said rounded portion of the primary ball,
a secondary ball having an axially symmetric rounded portion coaxially formed on the main shaft and spaced apart from said primary ball, and
a saddle having a secondary bearing surface spaced apart from said rounded portion of said secondary ball by some predetermined distance to form a substantially uniform gap about said rounded portion of secondary ball, said secondary bearing surface being in a similar orientation as said primary bearing surface, said main shaft, primary and secondary balls being movable with respect to said primary and secondary bearing surfaces, said gap providing an arrangement in which said secondary ball moves free from contact with said secondary bearing surface when said ball joint assembly is in proper condition.

9. The assembly of claim 8 wherein said secondary bearing surface has an inner longitudinal surface and an inner radial surface, said radial surface conforming to said rounded portion of said secondary ball, said longitudinal surface conforming to the rounded portion of said primary ball.

10. The assembly of claim 8 wherein said predetermined distance is between 0.05 inches and 0.07 inches.

11. The assembly of claim 8 wherein a dimension of the secondary ball is between 50 percent and 70 percent of a corresponding dimension in the primary ball.

12. The assembly of claim 8 having a means for signalling ball joint deterioration.

13. The assembly of claim 12 wherein said means for signalling ball joint deterioration includes a microswitch in contact with said secondary ball.

14. A ball joint assembly comprising,
a main shaft having a longitudinal axis,
a first ball joint having a primary ball member and a primary bearing surface, said primary ball member being axially attached to said main shaft and being in movable frictional contact with said primary bearing surface,
a second ball joint having a secondary ball member and a secondary bearing surface, said secondary ball being coaxial with said primary ball and spaced apart from said primary ball member by some predetermined distance along the shaft, said secondary ball disposed adjacent to but spaced apart from said secondary bearing surface to form a substantially uniform gap about said secondary ball member, said secondary bearing surface having an inner radial surface conforming to an outer rounded surface of said second ball member and having an inner longitudinal surface conforming to an outer rounded surface of said first ball member, and
a stationary housing defining said primary and secondary bearing surfaces in similar orientation, said shaft being movable in said housing, whereby movement of said shaft in the housing causes said gap to narrow as the first ball joint deteriorates from said frictional contact.

15. The assembly of claim 14 wherein said predetermined distance is between 0.05 inches and 0.07 inches.

16. The assembly of claim 14 wherein said secondary ball has a dimension between 50 percent and 70 percent of a corresponding dimension in the primary ball.

17. The assembly of claim 14 having a means for signalling ball joint deterioration.

18. The assembly of claim 17 wherein said means for signalling ball joint deterioration includes a microswitch in contact with said secondary ball.

* * * * *